United States Patent [19]
Tuthill et al.

[11] 3,826,069
[45] July 30, 1974

[54] APPARATUS FOR COLLECTING CROPS

[76] Inventors: George Robert Tuthill, Wardington House, Wardington, Banbury, Oxfordshire; Julian Harold Vazeille Temperley; Humphrey Peter Neville Temperley, both of Pass Vale Farm, Burrow Hill, Kingsbury, Martock, Somerset, all of England

[22] Filed: June 13, 1972

[21] Appl. No.: 262,318

[30] Foreign Application Priority Data
June 17, 1971  Great Britain .................... 28557/71

[52] U.S. Cl. ............................................. 56/328 R
[51] Int. Cl. ............................................. A01d 51/00
[58] Field of Search ......... 56/328 R, 12.8, 16.5, 330

[56] References Cited
UNITED STATES PATENTS

| | | | |
|---|---|---|---|
| 2,781,625 | 2/1957 | Phelps et al. ...................... | 56/328 R |
| 2,870,594 | 1/1959 | Larsh .............................. | 56/328 R |
| 2,978,859 | 4/1961 | Tubbs ............................. | 56/328 R |
| 3,105,343 | 10/1963 | Anderson et al .................. | 56/328 R |
| 3,182,437 | 5/1965 | Ramacher et al ................. | 56/328 R |
| 3,568,422 | 3/1971 | Thies .............................. | 56/328 R |
| 3,591,948 | 7/1971 | Brumbaugh ...................... | 56/328 R |

*Primary Examiner*—Hugh R. Chamblee
*Assistant Examiner*—J. N. Eskovitz
*Attorney, Agent, or Firm*—William R. Liberman

[57] ABSTRACT

An apparatus is provided for collecting crop elements from the surface of the ground, particularly cider apples and perry pears which are allowed to fall to the ground before collection, and for separating the crop elements from debris. The apparatus includes an elongate duct having an inlet at one end for crop elements and debris. Draught inducing means for example, a fan, are provided to draw the crop element and debris into the duct in a generally horizontal direction. The crop elements are drawn along the duct adjacent the floor thereof, and the debris is drawn through the duct. Means are provided for directing the crop element and debris to separate destinations.

3 Claims, 2 Drawing Figures

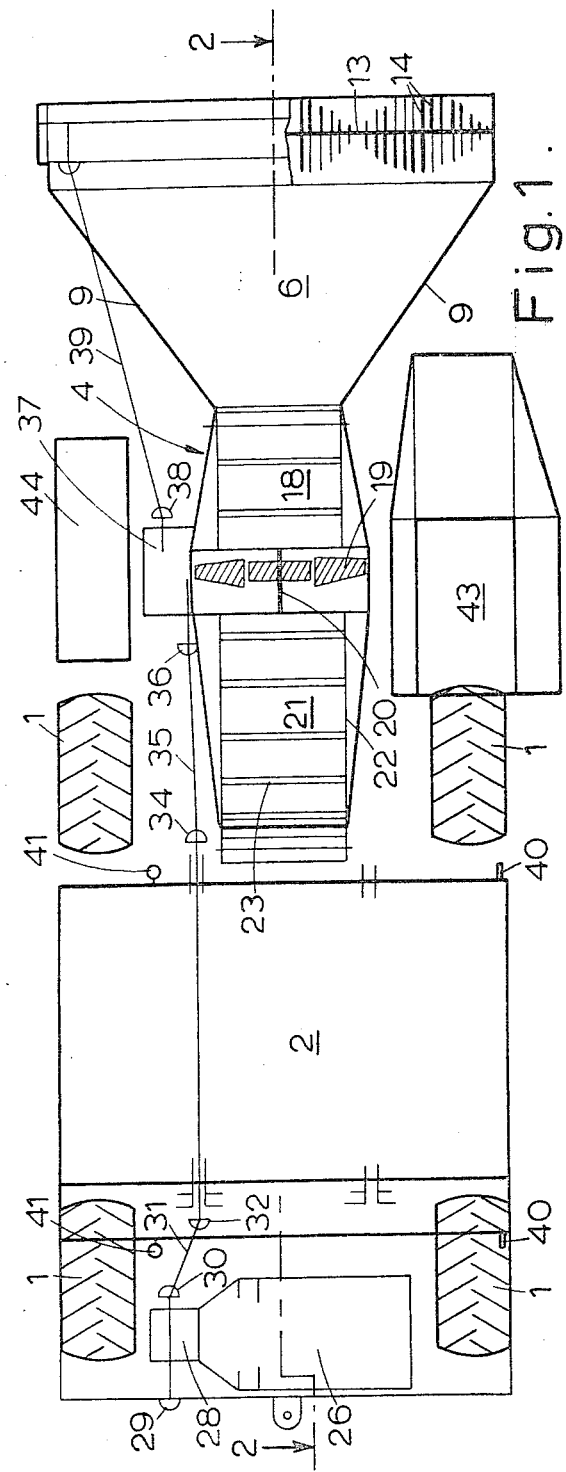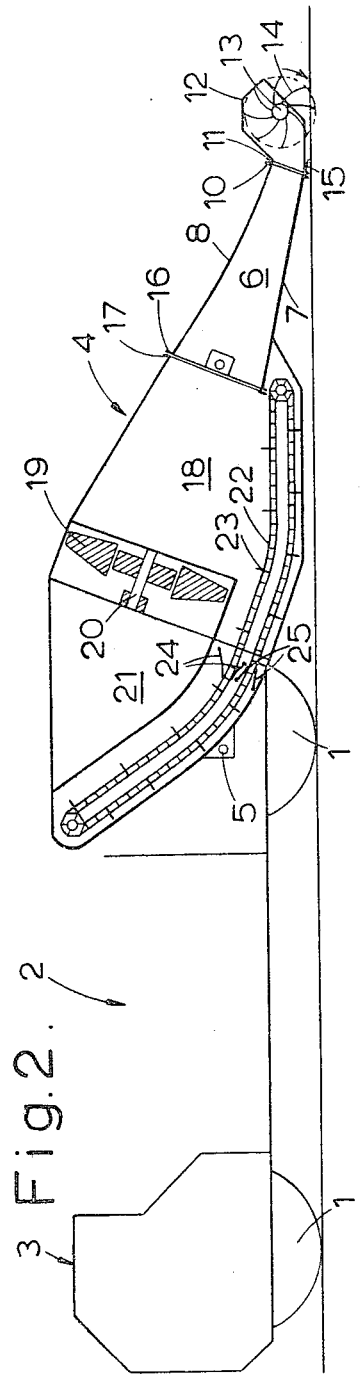

APPARATUS FOR COLLECTING CROPS

This invention relates to apparatus for collecting crop elements in the nature of fruits, and vegetables from the surface of the ground, particularly but not exclusively for collecting cider apples and perry pears which are allowed to fall from the trees before they are collected for processing. A known problem with such apparatus is that of separating the crop elements from loose twigs, leaves, grass and like debris which, for such an apparatus to be commercially acceptable, have to be substantially wholly excluded from the storage container which is to receive the crop.

According to the present invention there is provided an apparatus for collecting crop elements from the surface of the ground and separating the said elements from debris, comprising an elongate duct having an inlet for crop elements and debris at one end; draught inducing means for drawing the crop elements and debris into the said duct in a generally horizontal direction, for drawing the crop elements adjacent the floor of the said duct, and for drawing the debris through the said duct; and means for directing the crop elements and debris to separate destinations.

It is found in practice that the motion of the crop elements consists of one or more "hops" along the floor of the duct. After entering the duct the crop elements are accelerated by the draught, which may be at an air velocity of up to 70 m.p.h. (112k.p.h) or even more. As this occurs the relative velocity of the elements and the air drops and the elements tend to fall. The elements will lose speed on lifting the floor of the duct and so may rise from the floor again under the influence of the draught. This process may be repeated a number of times.

The apparatus may include an elevator at the downstream end of the duct for elevating the crop elements to a suitable level and depositing them in a storage container. Conceivably, however, the duct could be upwardly inclined to a sufficient extent to make the provision of such an elevator unnecessary.

It is a particularly important feature of the invention that the inlet end of the duct is arranged so that the crop elements are drawn into the duct by movement in a substantially horizontal direction, as this minimises the power required to set the crop elements in motion and accelerate them into the duct. Preferably the roof of the duct extends to a substantial extent beyond the termination of its floor at the inlet so as in operation to create a "wind tunnel" whose roof is that of the duct and whose floor is the ground; such an arrangement creates a large area of draught over the ground and has the further advantage that grass lifted over the terminal edge of the duct floor provides a sloping ramp which assists the horizontal movement of the crop elements into the duct.

Preferably driven rotary tines are provided at the inlet of the said duct to urge the crop elements thereinto; such tines are particularly useful for picking up crop elements which may be buried to some extent in grass.

Preferably the said draught-inducing means comprises a fan positioned at a location remote from the crop inlet, the arrangement preferably then being such that in operation the said loose debris are drawn into the fan and ejected from the apparatus through the same.

The means for directing the crop elements to a destination separate from that of the loose debris may take any of a number of forms. Preferably such means includes a crop element conveyor arranged so as at least to assist the movement of the crop elements once they have become separated from the loose debris. Then, when the draught-inducing means comprises a fan the said conveyor is arranged to lead the crop elements under the level of the fan and thence to deliver them to a crop element outlet.

Apparatus incorporating such a conveyor preferably includes means in the form of a one-way valve or gate for preventing the crop elements from being blown back from the downstream end region of the conveyor into the region of sub-atmospheric pressure within the duct. In a presently preferred form of the invention such means comprises one or more sets of flexible flaps, e.g., of rubber, extending across the conveyor above and below the same and angled so as to permit the passage of crop elements in the direction of conveyor movement but not in the opposite direction. Alternatively a driven or freely rotatable rotary valve, e.g., in the form of a shaft carrying radially extending vanes, may be mounted to extend across the surface of the conveyor. In addition to or instead of such means, however, the conveyor may be provided with transverse flights so as positively to engage the crop elements and carry them along.

In some forms of the invention one or more dividing members such as baffles or the like can be provided in the duct for keeping the crop elements and the loose debris separate once their separation has occurred, and such members may be mounted for positional adjustment to enable their optimum effects to be achieved. For example, in certain locations in the apparatus it may be found that crop elements have a particular tendency to "jump up" and positioning baffles at such locations will improve the degree of separation of crop and debris.

Apparatus according to the invention may be of a self-contained nature incorporating its own power unit or units both for driving the crop-collecting mechanisms and for propelling the apparatus over the ground. Alternatively the apparatus can be adapted to be connected to a tractor and driven from the tractor's power take-off. In the latter case, although the apparatus may be wheeled it can alternatively be arranged to be carried by a tractor with the said duct extending forwardly from the latter in cantilever fashion.

Preferably the crop inlet of the duct is of broad flat configuration, whilst the main body of the duct is tubular, e.g., of substantially rectangular cross-sectional shape.

When the cross-sectional shape of the duct varies along its length in a manner such as is described above it is nevertheless preferable that the cross-sectional area of the duct should be maintained substantially constant along its length so as to avoid any substantial variation in air speed along the length of that region of the duct in operation. This can be achieved, for example, by having a flat floor to the duct, side walls which converge in a downstream direction, and a curved roof, or by having a flat floor and a flat roof which diverge from one another, and curved side walls.

It can be appreciated that for successful operation of apparatus according to the invention it must be ensured that the draught induced in the said duct is not so high as to lift the crop elements off the floor of the duct to any great extent, whilst being high enough to stop the loose debris from falling to the duct floor, so as to achieve satisfactory separation. It has been found, however, that adjustment of the apparatus to achieve this effect is not difficult.

An embodiment of the invention, in the form of an apparatus particularly adapted for collecting cider apples or perry pears from the ground in an orchard, will now be described by way of example and with reference to the accompanying diagrammatic drawings, in which:

FIG. 1 is a plan view of the apparatus, and

FIG. 2 is a longitudinal vertical sectional view taken along line 2—2 in FIG. 1.

The apparatus illustrated in the drawings comprises a frame (most of which has been omitted from the drawings for the sake of simplicity) which is supported on wheels 1, a container 2 for the collected crop, a power unit 3 rearwardly of the container 2 and an apple-collecting arrangement 4 mounted on the frame forwardly of the container 2 by lugs 5. The arrangement 4 includes a duct 6 having a flat floor 7, a concave rearwardly diverging roof 8 (as seen in longitudinal section), and converging side walls 9. The inlet end of the duct 6 terminates in a flange 10 to which is attached a flange 11 of a cowl 12 which is open at its side facing the ground. A tine shaft 13 is rotatably mounted within the cowl 12 and is provided with rubber tines 14. The tines continually traverse the ground adjacent the inlet of the duct 6 to drag apples into the duct. The practical effect of the overhang of the cowl 12 is to create a wind tunnel whose roof is that of the cowl and whose floor is the ground surface. This has the result that a much larger area of the ground is subjected to be draught induced in the duct than would be the case if the roof and the floor were to terminate at the same point; entry of apples into the duct is facilitated by the fact that, in operation, a sloping ramp of grass, drawn by the suction, tends to build up over the edge of the duct floor. This may be aided if desired by the provision of a transversely extending plate 15 at the lower front end of the duct 6. The arrangement of the duct inlet in this manner, so that the apples are drawn into the duct in a substantially horizontal direction rather than being lifted to any substantial extent, minimises the power requirements of the apparatus and contributes very greatly to its notable efficiency. The apples are in effect swept horizontally into the duct in a high speed air stream rather than lifted vertically as in some known prior arrangement.

The duct is connected at its rearward end by a flange 16 to a flange 17 of a separation chamber 18. This chamber diverges rearwardly both in plan and elevation, and is provided with a fan 19 mounted on an axle 20 which extends substantially parallel to the length of the chamber 18. The chamber 18 communicates at its rearward end with a debris outlet duct portion 21 which has side walls but is open at the top.

An endless conveyor 22 extends from the front of the chamber 18 parallel with the floor thereof and rearwardly and upwardly below and behind the debris outlet duct 21. The conveyor 22 is a roller chain conveyor, that is to say it consists of two chains, one at each edge each of which chains carries rollers which engage in guide tracks (not shown). Between the two chains there extend slats which form the floor of the conveyor, and transverse flights 23 are provided at intervals along the conveyor. A pair of rubber flaps 24 and 25 are mounted on either side of the upper and lower run of the conveyor 22 respectively for a purpose discussed below.

The power unit 3 may conveniently comprise a diesel engine shown diagrammatically at 26 from which power is transmitted to a bevel gear box 28. The bevel gear box has a rearward drive to a power take-off 29 for operating any desired auxiliary equipment and a forward drive into a universal joint 30. The gear box also drives one or more steplessly variable displacement fluid pumps which supply fluid to fluid hubs attached to each of the rear wheels (the pumps and hubs have been omitted from the drawings being of conventional construction). In this way drive to move the whole apparatus is supplied to the rear wheels.

From the joint 30 a shaft 31 extends forwardly and downwardly to a further universal joint 32 under the rear of the container 2. A shaft 33 extends from the joint 32 to a universal joint 34, the shaft being located under the container. From the joint 34 a shaft 35 extends forwardly and upwardly to a universal joint 36 from which drive is supplied to a conveyor drive assembly 37. The drive assembly 37 includes a large pulley around which is looped a belt which drives the fan at an appropriate speed e.g., 3,000 r.p.m. The assembly 37 also includes a bevel gear box from which drive at a reduced speed is supplied by a chain to the conveyor 22 at either one of its ends. Drive is also transmitted forwardly to a universal joint 38 connected by a forwardly and downwardly directed shaft 39 to a universal joint from which drive is supplied to a bevel gear box driving the shaft 13.

It will be appreciated that any other suitable transmission might be substituted for that described above, and many variations are possible. For example one might mount the engine in line instead of transversely as shown.

In operation, when the fan 19 is rotating, a strong draught is induced along the inlet duct 6 the chamber 18 and the outlet 21, from front to rear thereof so as to draw apples into the duct inlet and along the duct. The entry of the apples into the duct is assisted by the tines 14 which rotate in the direction indicated in FIG. 2. At the same time as the apples enter the duct loose debris such as twigs, leaves and grass are also drawn in. The apples and the loose debris are sucked at a high speed along the duct 6 and into the chamber 18 and during their travel along the duct the greater weight/surface area ratio of the apples causes them to remain on (or fall to) the floor of the duct 6 whilst the loose debris is maintained floating at a higher level in the duct. On passing into the chamber 18, the loose debris is drawn into the fan 19 and ejected from the apparatus through the outlet 21. The force with which the debris is ejected causes it to land well behind the apparatus and hence avoids debris landing in the container 2. The apples on the other hand are deposited on the conveyor 29, to be carried along the conveyor and into the container 2. The flaps 24 and 25 serve to allow the apples to pass but at the same time to prevent them from being blown back into the duct from the downstream end region of the conveyor.

The container 2 is pivotally mounted at 40, and can be tipped by means of hydraulic rams 41. Thus when the container is full the rams can be operated to empty the contents of the container into, for example, a lorry for further transport. The arrangement 4 is also pivotally mounted on the lugs 5 and can be moved out of the operating position by means of hydraulic rams 42 one of which is shown in FIG. 2.

Operation of the apparatus is controlled from a driver's cab 43, and FIG. 1 also shows a fuel tank 44.

It will thus be seen that the invention, at least in its preferred embodiment illustrated in the drawings, provides crop collecting apparatus, particularly for collecting cider apples or perry pears from the ground in an orchard, which is effective to achieve efficient separation of the crop elements from loose debris such as twigs, leaves and grass, from the transmission of the crop to a suitable container.

We claim:

1. An apparatus for collecting crop elements from the surface of the ground and separating the said elements from debris comprising a housing, a plurality of compartments therewithin, a substantially horizontally extending straight-line duct within the housing, the duct having a forwardly facing inlet opening for crop elements and debris at its front end; draught-inducing means within the housing for inducing a draught flowing in a straight line substantially horizontally rearwardly through said inlet opening for drawing the crop elements and debris into the said duct in a generally horizontal direction, the draught drawing the crop elements adjacent the floor of the said duct and drawing the debris through the said duct, and means related to the respective weights thereof for positively directing the crop elements and debris to separate compartments in said apparatus and wherein the downstream end of the duct communicates with a chamber and the means for directing the crop elements comprises a conveyor which extends adjacent the floor of the chamber in a rearward direction thereby to transport crop elements rearwardly from the said chamber.

2. An apparatus as claimed in claim 1, where means in the form of flaps are disposed on either side of each run of the conveyor for preventing suction of crop elements along the conveyor in a direction toward the duct inlet.

3. An apparatus as claimed in claim 1, wherein the conveyor is provided with transverse slats adapted to be engaged by crop elements on the conveyor.

* * * * *